US005755099A

United States Patent [19]

Hung

[11] Patent Number: 5,755,099

[45] Date of Patent: May 26, 1998

[54] HYDRAULIC CIRCUIT SYSTEM FOR ONE-TOUCH JACK AND ITS STRUCTURE

[75] Inventor: Michael Hung, Lu Chu Hsiang, Taiwan

[73] Assignee: MVP (H.K.) Industries Ltd., King's Road North Point, Hong Kong

[21] Appl. No.: 742,762

[22] Filed: Nov. 1, 1996

[51] Int. Cl.$^{6}$ .............................. F16D 31/02

[52] U.S. Cl. .............................. 60/479; 60/481; 60/482

[58] Field of Search .............................. 60/479, 481, 482

[56] References Cited

U.S. PATENT DOCUMENTS

| | | | |
|---|---|---|---|
| 1,529,814 | 3/1925 | Rigby | 60/481 |
| 2,199,158 | 4/1940 | Hein et al. | 60/482 |
| 2,702,988 | 3/1955 | Rhoads et al. | 60/482 |
| 2,979,032 | 4/1961 | Engquist et al. | 60/481 |
| 3,581,499 | 6/1971 | Barosko | 60/479 |
| 3,890,684 | 6/1975 | Tallman | 60/481 |
| 4,339,942 | 7/1982 | Svensson | 60/479 |

*Primary Examiner*—F. Daniel Lopez
*Attorney, Agent, or Firm*—Bacon & Thomas

[57] ABSTRACT

A hydraulic circuit system for one-touch jack and its structure has an inlet circuit, a return circuit and an overload protection circuit with a hydraulic cylinder, a piston rod, a sequence valve, a safety valve and a relief valve, in which the inlet circuit extends from an outer reservoir of a hydraulic cylinder via a check valve to connect to an oil chamber of a manual pump. The oil chamber of the pump is connected to an oil guide tube via another check valve, the oil guide tube is inserted into an inner oil chamber formed in a piston rod to form a closed circuit. The oil chamber of the pump is connected to an inner chamber of the hydraulic cylinder via a sequence valve and the inner chamber is connected to the outer reservoir via a check valve. When the maximum effect capacity of the oil chamber of the piston rod, a single touch of the pump can raise the hydraulic jack to the required loading position for raising at no load or light load conditions.

4 Claims, 7 Drawing Sheets

HYDRAULIC CIRCUIT SYSTEM FOR ONE-TOUCH JACK AND ITS STRUCTURE

BACKGROUND OF THE INVENTION (a) Field of the Invention

The present invention relate to a hydraulic circuit system for a jack and its structure, particularly a hydraulic circuit system and structure which can have a piston rod to raise a raising arm and support plate to a loading position to support and raise a load in "one step" by a single operation of a manual pump at no load or light load condition.

(b) Description of the Prior Art

Conventionally a hydraulic jack comprises mainly a manual pump, a hydraulic cylinder with inner and outer reservoirs, a piston rod, a relief valve, a safety valve and a related hydraulic circuit. The outer end of the piston rod is linked to a raising arm and support plate. However, in such a conventional structure, a rocker or handle is usually pulled and pushed repeatedly to pump hydraulic fluid to drive the piston rod upward and consequently support and raise a load gradually.

In the conventional jack structure, the rocker or handle is to operated repeatedly either in no load or light load conditions to pump sufficient hydraulic fluid to operate the hydraulic cylinder and raise the piston rod for rising the raising arm and support plate accordingly in a very slow speed. The same speed occurs even if there is no load on the jack, or even the load is very light. It is a time and labor consuming process, and it can't be raised immediately in order to respond to the need promptly wherever there is an emergency such as for rescue purpose in some accident where heavy weight is involved.

SUMMARY OF THE INVENTION

The main objective of the present invention is to provide a hydraulic circuit system for one-touch jack and its structure comprises mainly an inlet circuit, a return circuit and an overload protection circuit in which the inlet circuit extends from an outer reservoir of a hydraulic cylinder via a check valve to connect to an oil chamber of a manual pump, while the oil chamber of the pump is connected to an inner oil chamber at a piston rod via another check valve, the oil chamber of the pump is connected to an inner chamber of the hydraulic cylinder via a sequence valve, and the inner chamber is connected to the outer reservoir via a check valve. When the maximum effective capacity of the oil chamber of the pump is greater than or equal to the inner oil chamber of the piston rod, the inlet circuit can provide hydraulic fluid from the pump via an oil guide channel to the inner oil chamber of the piston rod to drive the piston promptly, as where the volume of hydraulic fluid in the oil chamber of the pump is greater than that in the inner oil chamber of the piston rod, the piston rod and the jack can reach the desired loading position in one step. In this way, the slow speed in operation and raising of the conventional jack is eliminated, consequently, working efficiency can be improved.

Another objective of the present invention is to provide a hydraulic circuit system for one-touch jack and its structure having a pump, a relief valve, a sequence valve and a safety valve at the rear block of the hydraulic cylinder, particularly an inner oil chamber in the piston rod where an oil guide tube can be inserted while another end of the oil guide tube is locked to the rear block of the hydraulic cylinder and the oil guide tube is connected to an oil channel of the pump so that the hydraulic fluid in the oil chamber of the pump can enter the inner oil chamber of the piston rod via the oil guide tube to push the piston to the desired position in one step when the volume of hydraulic fluid in the oil chamber of the pump is greater than that in the inner oil chamber of the piston Another objective of the present invention is to provide a hydraulic circuit system for one-touch jack and its structure in which the oil chamber of the pump is designed with an oil channel to connect to the oil guide tube via a check valve. The oil channel passes through a safety valve and a relief valve in order. The safety valve's oil channel has two branches connected to the inner chamber and outer reservoir of the hydraulic cylinder respectively, and has a check valve between such two branches to prevent flowing of the hydraulic fluid from the oil chamber of the pump to the inner chamber and outer reservoir. The inner chamber has a sequence valve to connect to the safety valve. The said relief valve is connected to the inner chamber and outer reservoir respectively, and has an oil guide channel to passing through the sequence valve so that the hydraulic fluid can flow back from the inner chamber to the outer reservoir.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENTS

Figure 1:
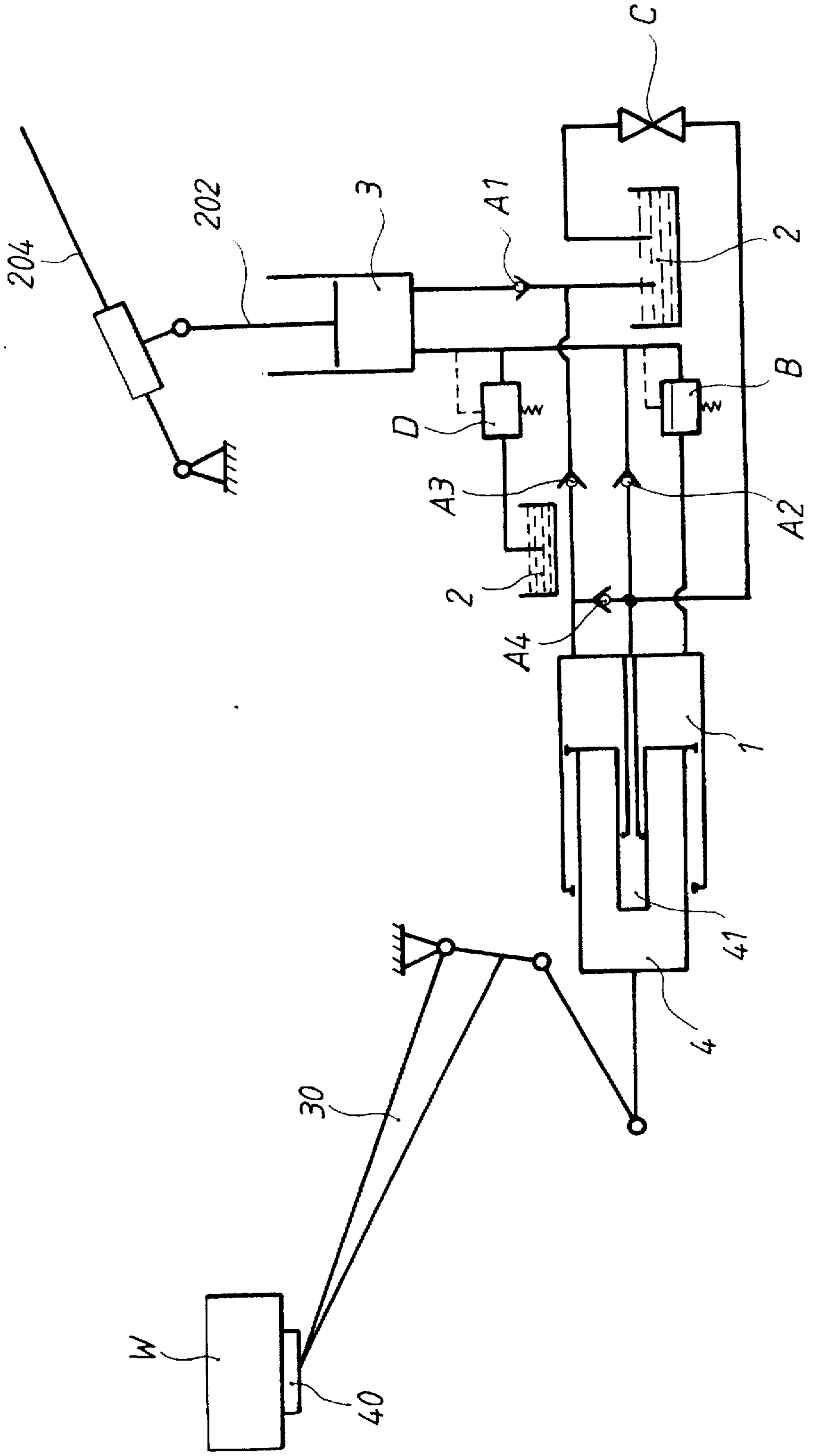
FIG. 1 illustrates a hydraulic circuit system according to the present invention.
Figure 2:
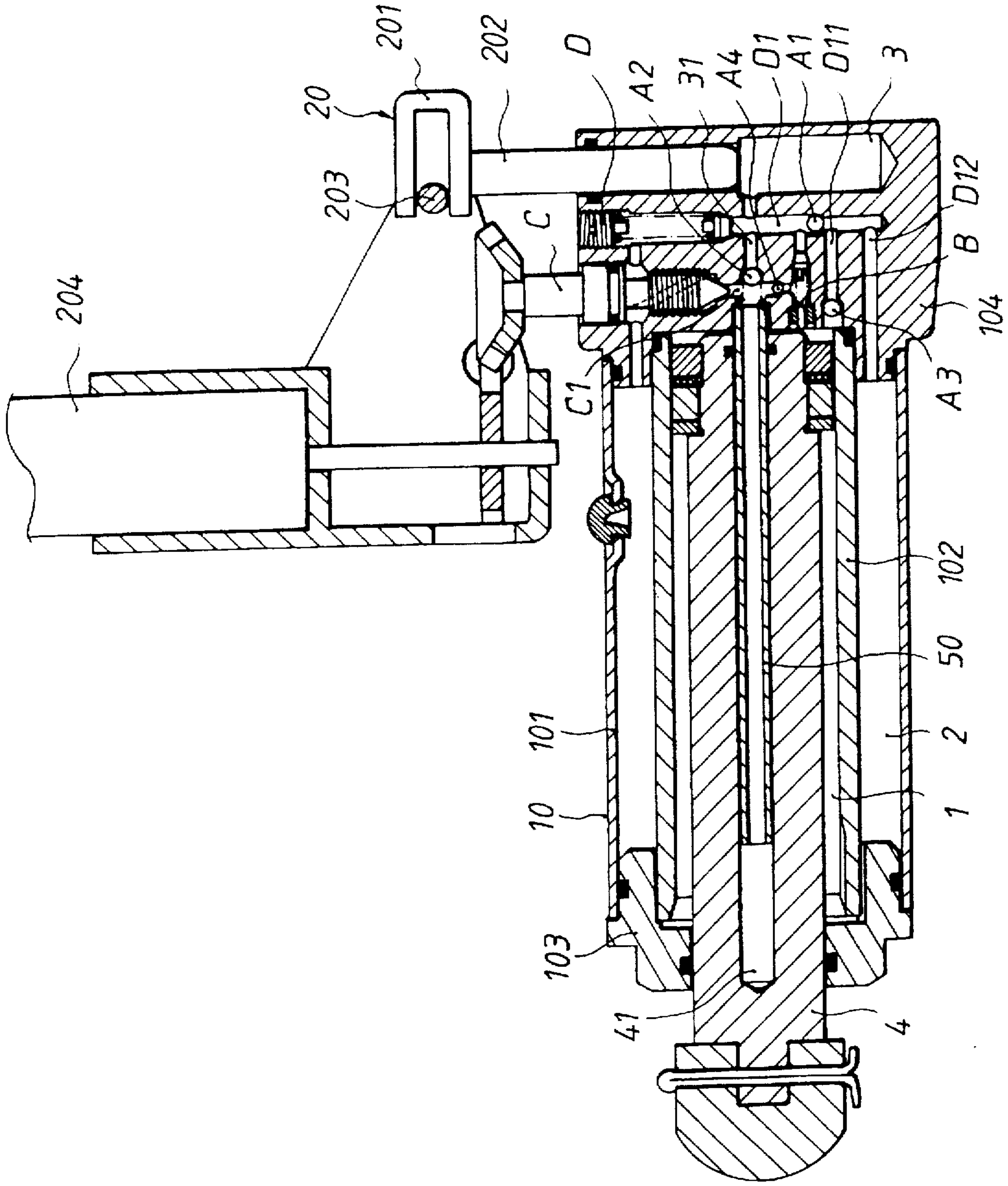
FIG. 2 is a cross sectional view of structure of a jack according to the present invention.

As shown in FIG. 1, the hydraulic circuit system for one-touch jack according to the present invention comprises mainly an inlet circuit, a return circuit and an overload protection circuit together with a hydraulic cylinder 10 with an inner chamber 1, an outer reservoir 2, a pump oil chamber 3, and piston rod 4 with an inner oil chamber 41 as well as other components in a configuration shown in FIG. 2.

The inlet circuit extends from the outer reservoir 2 of the hydraulic cylinder 10 via a check valve A1 to the pump oil chamber 3, and then via another check valve A2 to an inner oil chamber 41 of the piston rod 4. The said pump oil chamber 3 is connected to the inner reservoir 1 of the hydraulic cylinder 10 via a sequence valve B. The said outer reservoir 2 is connected to the inner reservoir 1 of the hydraulic cylinder 10 via a check valve A3. Therefore, at no load or light load condition, the inlet circuit can provide hydraulic fluid in sequence via the pump oil chamber 3 to the inner oil chamber 41 of the piston rod 4 to drive the piston rod 4 immediately.

The return circuit extends from the inner chamber 1 of the hydraulic cylinder 10 to the inner oil chamber 41 of the piston rod 4 via a check valve A4, and then passes through a relief valve C to connect to the outer reservoir 2. After unloading, the relief valve C can be regulated to relief condition to make the return circuit in open condition so as to resume its original position.

The overload protection circuit extends from the outer reservoir 2 of the hydraulic cylinder 10 via a safety valve D to connect to the pump oil chamber 3. Whenever the pressure of the hydraulic cylinder 10 is greater than the rated pressure, the safety valve D is opened to start the overload protection circuit automatically.

With the aforesaid hydraulic circuit, particularly when the ratio of the maximum effective capacity of the pump oil chamber 3 to the maximum effective capacity of the inner oil chamber 41 of the piston rod 4 is greater than or equal to one, the hydraulic jack can be raised to the required loading condition by one-touch at no load or light load condition.

As shown in FIG. 2, an embodiment of the aforesaid hydraulic circuit design for jack comprises mainly a cylinder 10 and a piston rod 4.

The hydraulic cylinder 10 is composed of an external cylinder body 101 and an inner cylinder body 102. It has a front block 103 at the front end, and a rear block 104 at the rear end. The hydraulic cylinder 10 has an inner chamber 1 and an outer reservoir 2 which are separated from each other. At the rear block a pump 20, a sequence valve B, a relief valve C and a safety valve D are placed in compliance with the above described hydraulic circuit.

The piston rod 4 is placed within the inner chamber 1 of the hydraulic cylinder 10. It can be displaced by hydraulic action to raise or lower a rising arm 30 and top plate 40 of the jack. It has further an inner oil chamber 41 within its rod body in a manner that a oil guide tube 50 can be inserted into the inner oil chamber 41 of the piston rod 4, while an end of the oil guide tube 50 is locked to the rear block 104 of the hydraulic cylinder 10, and connected to an oil channel 31 of the pump oil chamber 3 so that the hydraulic fluid at the pump oil chamber 3 can enter the inner oil chamber 41 of the piston rod 4 via the oil guide tube 50 to raise the piston rod 4.

The aforesaid pump 20 comprises a traction block 201, a plunger 202 and a rocker 204 fixed by a fixing pin 203. By upward and downward movement of the rocker 204, the hydraulic fluid in the pump oil chamber 3 can be circulated. The pump oil chamber 3 has an oil channel 31 to connect to the said oil guide tube 50 via the check valve A2, and the oil channel 31 is passes through the safety valve D and the oil channels D1 and C1 of the relief valve in order. The safety valve D has an oil channel D1 with two branch oil channels D11 and D12 to connect to the inner chamber 1 and the outer reservoir 2 of the hydraulic cylinder 10 respectively. Between the branch oil channels D11 and D12 there are check valves A3 and A1 to prevent entry of hydraulic fluid from the pump oil chamber 3 into the inner chamber 1 and outer reservoir 2. The inner chamber 1 is incorporated with a sequence valve B to connect to the oil channel D1 of the safety valve D. The said relief valve C is connected to the outer reservoir 2 and the inner chamber 1 respectively and has an oil guide channel C1 to pass through the sequence valve B so that the hydraulic fluid from the inner chamber 1 can be returned to the outer reservoir 2 directly through the oil guide channel C1 which has a check valve A4 to prevent flowing of the hydraulic fluid from the pump oil chamber 3 to the inner chamber 1.

Figure 3:
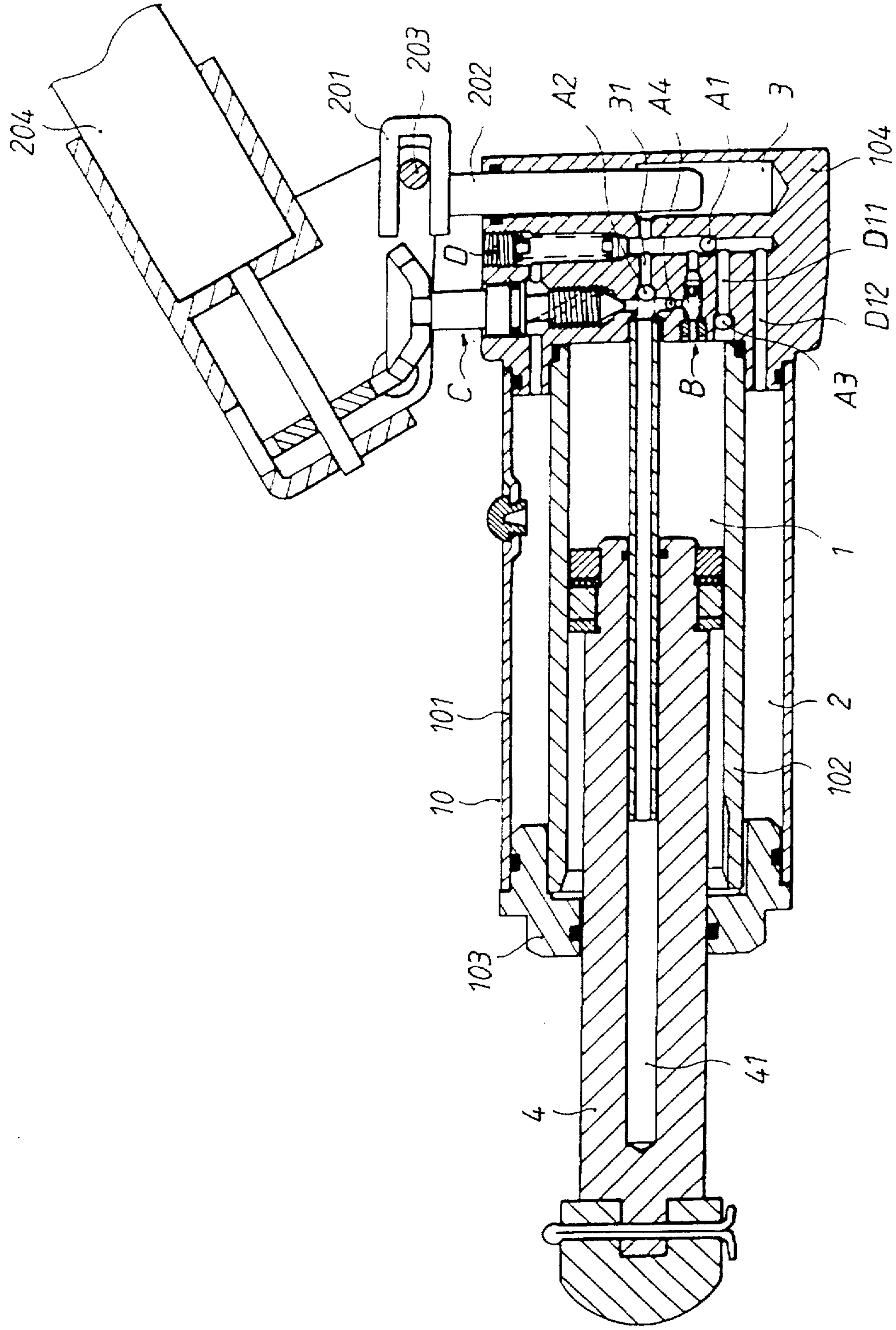
FIG. 3 illustrates displacement of the piston rod to its loading position in one step.

With the aforesaid hydraulic circuit design, when the jack is in no load or light load condition, a single rotating of the rocker 204 can raise the plunger 202 of the pump 20 to the uppermost position to apply a pulling force so that the hydraulic fluid can flow through the oil channel 31 of the pump oil chamber 3, the oil guide tube 50 and the inner oil chamber 41 of the piston rod 4 in sequence to drive the piston rod 4, and, as the volume of hydraulic fluid in the pump oil chamber 3 is greater than or equal to the volume of hydraulic fluid in the inner oil chamber 41 of the piston rod 4, the piston rod 4 of the jack is raised to the loading position required in one step as shown in FIG. 3.

Figure 4:
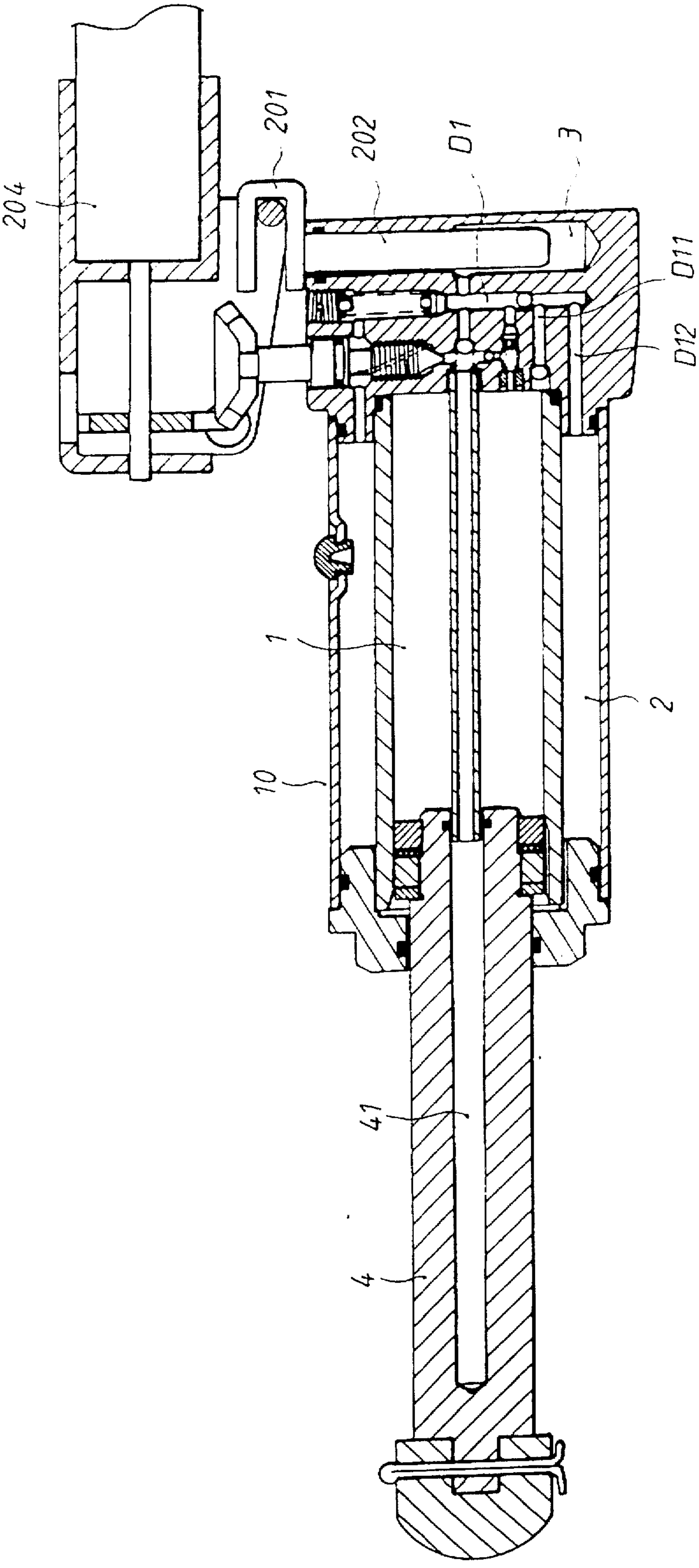
FIG. 4 illustrates further raising of the piston rod to support a load.

While the aforesaid hydraulic circuit is at no load or light load condition, whenever the piston rod 4 is displaced forward, as the pressure in the inner chamber 1 of the hydraulic cylinder 10 drops suddenly, the hydraulic fluid flows from the outer reservoir 2 via the oil channel D12 to replenish the inner chamber 1 automatically, and another flow of hydraulic fluid goes into the pump oil chamber 3 via the oil channel D1 for another operation of the pump 20. Then, the hydraulic fluid can not enter from the fully filled inner oil chamber 41 of the piston rod 4, the pressure to open the sequence valve B is thus reached. Therefore, the hydraulic fluid flows into the inner chamber 1 from the oil channel 31 of the pump oil chamber 3 and the oil channel of the sequence value B so that the piston rod can continue to hold and raise the load W upwards as shown in FIG. 4. In this respect, the sequence valve B can be set with an opening pressure.

Similarly, the aforesaid safety valve D can be set with an opening pressure so that the safety valve D is open when the piston rod 4 reaches its upper load limit or an overload is applied. In that case, the hydraulic fluid flows into the outer reservoir 2 from the pump oil chamber 3 via the safety valve D directly, and then return to the pump oil chamber 3 via the oil channel D12 to form a safety circuit restricting flowing of the hydraulic fluid into the inner chamber 1.

When it is closed, the aforesaid relief valve C prevents return of the hydraulic fluid to the outer reservoir 2 when the jack is used to maintain a load. However, after using it must be adequately loosened so that the hydraulic fluid in the inner oil chamber 41 of the piston rod 4 and the inner chamber 1 can return to the outer reservoir 2, and, simultaneously, the hydraulic fluid can only flow from the pump oil chamber 3 to the outer reservoir 2 via the relief valve C to repeat the same circulation without driving the piston rod 4.

Figure 5:
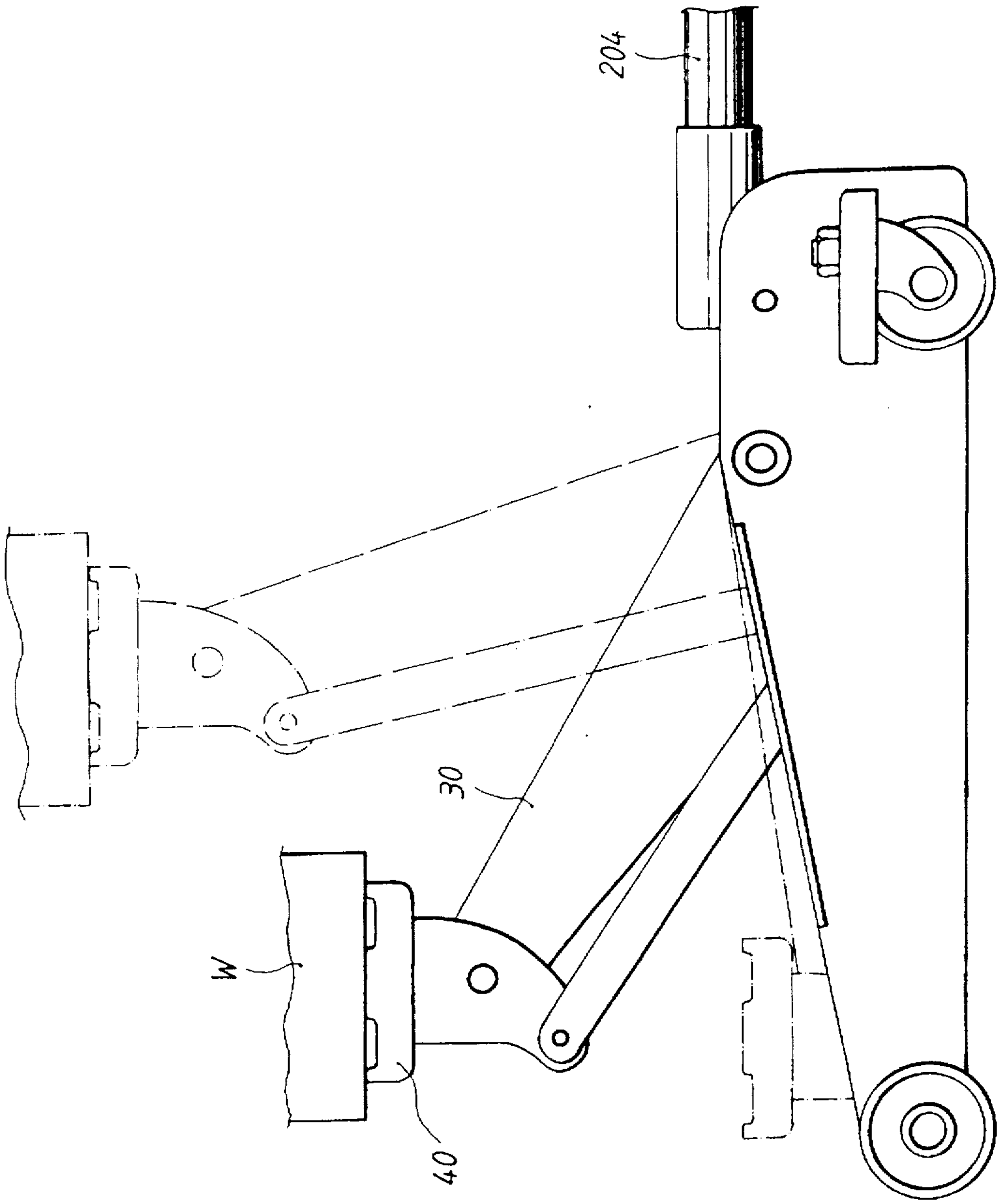
FIG. 5 illustrates displacement of the raising arm and support plate by action of the piston rod from a standstill position to a full raising position.

FIG. 5 illustrates the displacement of the raising arm 30 and the support plate 40 of the jack from standstill position to reach the load W in one step and to raise the load W consequently.

Figure 6:
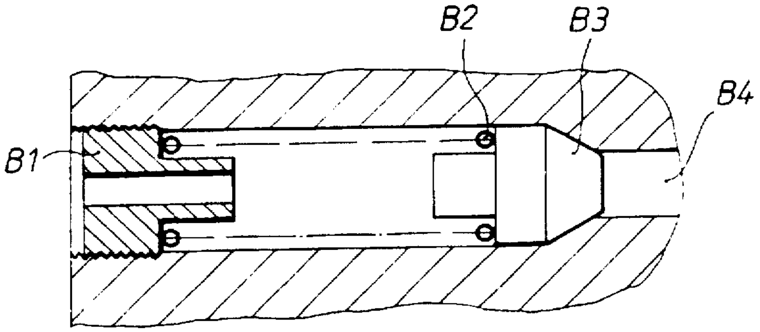
FIG. 6 is a sectional view of the sequence valve according to the present invention.

As described above, the sequence valve B can be preset for an opening pressure during assembly of the jack according to the present invention. Therefore, it can be designed according to the end user's actual need to assure that the opening pressure can meet different requirements. As shown in FIG. 6, the sequence valve comprises mainly a hollow spiral post B1, a retraction spring B2 and a conical valve B3 and it is designed so that it can be placed within an oil channel B4 connected to the oil channel D1 of the safety valve D. The hollow spiral post B1 is fixed to the outlet of the oil channel B4, and the conical valve B3 is placed to block a conical valve hole with the retraction spring B2 fixed between the hollow spiral post B1 and the conical valve B3.

The retraction spring B2 is compressed by the hollow spiral post B1 in different degree for different opening pressure setting.

Figure 7:
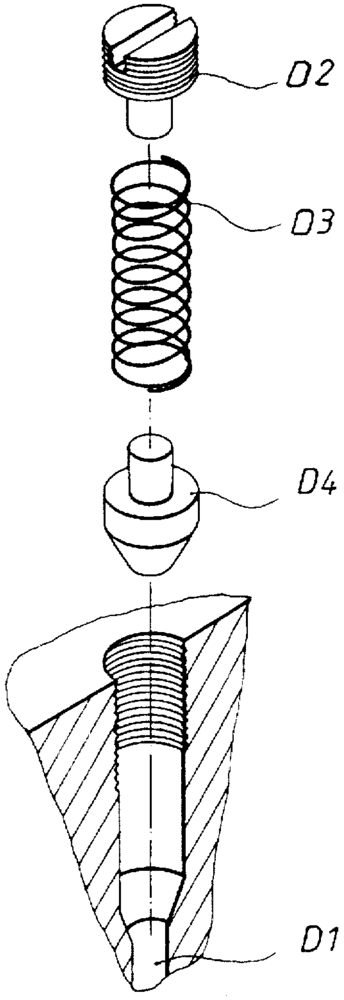
FIG. 7 is a perspective developed view of the safety valve according to the present invention.

Similarly, as shown in FIG. 7, the safety valve D according to the present invention has a structure substantially same with the sequence valve B. It comprises a spiral post D2, a retraction spring D3 and a conical valve D4. The safety valve D is placed at an oil channel D1. The retraction spring D3 is compressed by the spiral post D2 in different degree for different opening pressure setting. However, there is no hydraulic fluid to pass through the spiral post D2, therefore a solid spiral post D2 is used.

Figure 8:
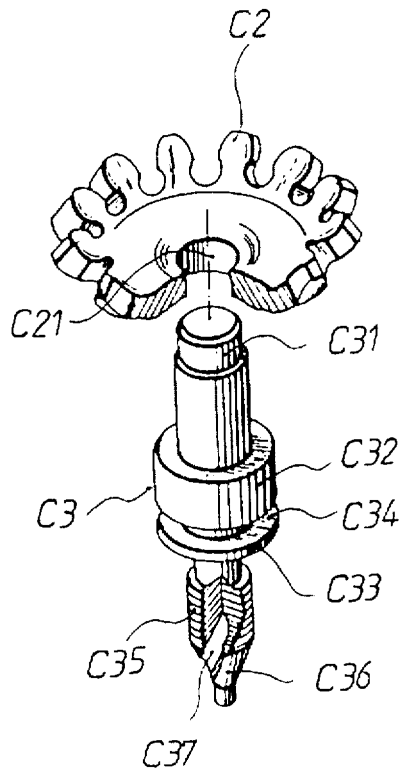
FIG. 8 is a perspective developed view of the reilef valve according to the present invention.

The relief valve C according to the present invention comprises mainly a return gear C2 and a return valve rod C3 as shown in FIG. 8.

The return gear C2 is designed with a fixing hole C21 at its center.

The return valve rod C3 is a stepped rod structure with a small annular rib C31 at its front end for fixing the fixing hole C21 at the center of the return gear C2, two stepped annular ribs C32 and C33 at its middle section and a threaded section C35 of appropriate length at the lower section. An annular groove C34 is formed between the steppe annular ribs C32 and C33 for holding of an oil seal. The threaded section C35 has a pin-end extension C36 where a declined passage C37 is formed.

Many changes and modifications in the above embodiment of the invention can, of course, be carried out without departing from the scope thereof. Accordingly, to promote the progress in science and the useful arts, the invention is disclosed and is intended to be limited only by the scope of the appended claims.

What is claimed is:

1. A one-touch jack comprising:

a) a hydraulic cylinder having a movable piston rod extending therefrom with a portion of the piston rod located in an inner chamber of the hydraulic cylinder, the piston rod having an inner oil chamber therein, the hydraulic cylinder having an outer reservoir;

b) a pump having a pump oil chamber and a plunger movable into and out of the pump oil chamber, a volume of the pump oil chamber being at least as large as a volume of the inner oil chamber of the piston rod;

c) an oil inlet circuit comprising: a first oil channel extending between the pump chamber and outer reservoir, a first check valve located in the first oil channel so as to allow hydraulic flow from the outer reservoir into the pump oil chamber and prevent flow in the reverse direction; a second oil channel extending between the pump oil chamber and the inner oil chamber of the piston rod, a second check valve located in the second oil channel to allow hydraulic flow from the pump oil chamber into the inner oil chamber of the piston rod when the plunger is moved into the pump oil chamber, and to prevent flow in the reverse direction; a third oil channel extending between the outer reservoir and the inner chamber, a third check valve located in the third oil channel to allow hydraulic flow from the outer reservoir into the inner chamber and to prevent flow in the opposite direction; and a fourth oil channel extending between the inner chamber and the second oil channel ahead of the second check valve, a sequence valve located in the fourth oil channel closing the fourth oil channel until a predetermined pressure is reached in the second oil channel, the sequence valve opening at the predetermined pressure to enable hydraulic flow from the second oil channel into the inner chamber, the sequence valve comprising:

i) a hollow post threadingly connected to the hydraulic cylinder in the fourth oil channel;

ii) a first conical valve element; and iii) a spring bearing against the hollow post and the first conical valve element biasing the first conical valve element toward a closed position, whereby a predetermined opening pressure may be set by rotating the hollow post to move the hollow post toward or away from the first conical valve element to vary the spring biasing force; and, d) an oil return circuit comprising: a fifth oil channel extending between the outer reservoir and the fourth oil channel at a location between the hollow post and conical valve element, the fifth oil channel also communicating with the inner oil chamber of the piston rod, a relief valve located in the fifth oil channel to selectively open or close the fifth oil channel.

2. The one-touch jack as claimed in claim 1 wherein the relief valve comprises a return gear affixed to a return valve rod, the return valve rod has a two stepped annular ribs at a middle section and a threaded section at a lower portion, an annular groove between the two stepped annular ribs for holding of an oil seal, and the threaded section having a pin-end extension with a passage.

3. The one-touch jack of claim 1 further comprising an overload protection circuit comprising a sixth oil channel in fluid communication with the outer reservoir and the second oil channel, a safety valve located in and normally closing the sixth oil channel, the safety valve opening when the pressure in the second oil channel reaches a predetermined relief pressure.

4. The one-touch jack of claim 3 wherein the safety valve comprises:

a) a solid post threadingly connected to the hydraulic cylinder in the sixth oil channel;

b) a second conical valve element; and c) a relief spring bearing against the solid post and the second conical valve element to bias the second conical valve element toward a closed position, whereby the predetermined relief pressure may be set by rotating the hollow post to move the hollow post toward on away from the second conical valve element to vary the spring biasing force on the second conical valve element.

* * * * *